(12) United States Patent
Teyssier

(10) Patent No.: US 8,160,793 B2
(45) Date of Patent: Apr. 17, 2012

(54) VEHICLE PARK BRAKE STATUS MONITORING METHOD

(75) Inventor: Pierre Teyssier, Toussieu (FR)

(73) Assignee: Renault Trucks, St. Priest (FR)

( * ) Notice: Subject to any disclaimer, the term of this patent is extended or adjusted under 35 U.S.C. 154(b) by 346 days.

(21) Appl. No.: 12/303,624

(22) PCT Filed: Jul. 13, 2006

(86) PCT No.: PCT/IB2006/003243
§ 371 (c)(1),
(2), (4) Date: Dec. 5, 2008

(87) PCT Pub. No.: WO2008/010014
PCT Pub. Date: Jan. 24, 2008

(65) Prior Publication Data
US 2010/0174464 A1    Jul. 8, 2010

(51) Int. Cl.
*G06F 19/00* (2011.01)
(52) U.S. Cl. .......................... 701/70; 701/29.1
(58) Field of Classification Search .................. 303/122, 303/122.09, 122.1, 122.15, 154; 701/29.1, 701/70
See application file for complete search history.

(56) References Cited

U.S. PATENT DOCUMENTS

| | | | | |
|---|---|---|---|---|
| 3,948,568 A | * | 4/1976 | Leiber | 303/122.1 |
| 4,860,640 A | * | 8/1989 | Ware | 92/63 |
| 5,004,299 A | * | 4/1991 | Brearley et al. | 303/15 |
| 5,358,075 A | * | 10/1994 | Jarzombek | 188/1.11 L |
| 5,892,437 A | * | 4/1999 | Scheibe et al. | 340/467 |
| 2004/0059479 A1 | * | 3/2004 | Fleming et al. | 701/29 |
| 2004/0182659 A1 | | 9/2004 | Siebke | |

FOREIGN PATENT DOCUMENTS

| | | |
|---|---|---|
| DE | 19744066 A1 | 4/1999 |
| EP | 604713 A2 * | 7/1994 |
| WO | 9212879 A | 8/1992 |
| WO | 95/33632 A | 12/1995 |
| WO | 03/029064 A1 | 4/2003 |
| WO | 2004/094209 A | 11/2004 |

OTHER PUBLICATIONS

Reinhall et al., "Development of an Intelligent Air Brake Warning System for Commercial Vehicles," May 31, 1996, IDEA Project, Contract ITS-I3.*

(Continued)

*Primary Examiner* — Thomas Black
*Assistant Examiner* — Sara Lewandroski
(74) *Attorney, Agent, or Firm* — WRB-IP LLP

(57) ABSTRACT

A vehicle brake system can include a service brake system and a park brake system wherein, the service brake system includes a service brake chamber is delimited by a service brake displaceable wall upon which a brake pushrod is fixed, the brake pushrod is connected to a vehicle braking arrangement and is capable of moving under a pneumatic pressure from a first position whereby the braking arrangement is released to a second position whereby the braking arrangement is actuated, the park brake system having an actuating arrangement capable of pushing the brake pushrod into its second position. This method is based on measuring the volume of the service brake chamber as the volume of the service brake chamber is a parameter which is representative of the actual position of the brake push rod and thus is representative of the actual park brake status.

19 Claims, 3 Drawing Sheets

OTHER PUBLICATIONS

Reinhall et al., "Development of an Intelligent Air Brake Warning System for Commercial Vehicles," May 31, 1996, IDEA Project, Contract ITs-I3.*

Reinhall et al., "Development of an Intelligent Air Brake Warning System for Commercial Vehicles," May 31, 1996, IDEA Project, V Contract ITs-13.*

Kandt et al., "Determination of air brake adjustment from air pressure data," 2001, IMechE, vol. 215, pp. 21-29.*

International Search Report for corresponding International Application PCT/IP2006/003243.

* cited by examiner

VEHICLE PARK BRAKE STATUS MONITORING METHOD

BACKGROUND AND SUMMARY

The present invention relates to a vehicle park brake status monitoring method.

Heavy duty vehicles such as trucks, buses, coaches as well as large trailers or semi-trailers are generally equipped with an air brake system whereby brakes are equipped with compressed air brake actuators on all axles.

A typical air brake system includes two air circuits, namely a service brake circuit and a park brake circuit.

The service brake circuit—which is usually divided into two independent circuits for safety reasons—is connected to a pedal upon which a vehicle driver can apply a foot brake pressure. The brake signal can be fed to an Electro pneumatic Brake System (EBS). The EBS electronically controls the service brake circuit. Depending on the pedal position, the EBS generates an electrical signal and redundantly a pneumatic signal. The electric signal is transmitted to a CPU. According to various parameters such as for example the vehicle's load situation, the vehicle speed and/or acceleration, the CPU calculates the appropriate pneumatic pressure for the vehicle brake cylinder to obtain a vehicle deceleration. The pneumatic signal is used in redundancy cases and performs similar functions.

FIG. 1 illustrates a typical brake cylinder 1 wherein an expandable diaphragm counteracting a return spring transfers the air pressure to a brake pushrod 5. The displacement of the brake pushrod activates a wheel braking mean for developing friction forces such as brake shoes of a drum brake or brake pads of a disc brake.

The park brake circuit operates under a different principle. The park brake circuit is usually connected to a hand lever. The hand lever controls the input of air pressure into a park brake chamber wherein a large power spring is counteracted by a flexible diaphragm which is connected to the park brake rod. When the park brake is not activated, air pressure is applied to the diaphragm; this counteracts the power spring and maintains the park brake rod in a first inward position. In contrast, when the park brake is actuated (or when there is a failure in the vehicle air system) air pressure is no longer applied to the diaphragm; the spring which is then not counteracted pushes the park brake rod and the vehicle brake is applied. The brake cylinder 1 depicted on FIG. 1 is typically fitted on a rear axle whereon park brake pressure is applied. As this is illustrated on FIG. 1, the park brake pushrod is in tandem with the brake pushrod. Thereby when the park brake is actuated, the park brake pushrod pushes the brake pushrod into a second outward position.

To ensure a satisfactory running of the vehicle, it is important that the vehicle driver is informed of the park brake status i.e. applied or released. To this end, the park brake status is usually based on the measure of the air pressure in the park brake chamber. A pressure sensor or a pressure switch can be fitted on the input port of the park brake chamber so as to monitor the pressure in said chamber.

When no air pressure is measured in the park brake chamber, the park brake is regarded as activated; a dashboard light and/or a reminder buzzer can notify the driver that the park brake is applied. In contrast when air pressure is measured in the park brake chamber, the park brake is regarded as released.

The current method of monitoring the park brake status is not entirely satisfactory insofar as this method only indirectly reflects the actual status of the park brake.

In the common occurrence of a park brake rod jammed by frost, the current method detects the park brake as released; in such a case, air pressure is duly detected in the park brake air chamber although the park brake rod is still jammed in an active position by frost or by any mechanical hitch. The driver is notified a message according to which the park brake is released
the dashboard light is turned off—and may drive on although the park brake is actually activated.

It therefore appears that there is room for improvements in the way the park brake status of heavy vehicles is monitored.

It is desirable to provide a pneumatic park brake monitoring method capable of reflecting the actual park brake status. The method of the present invention provides a method for monitoring a status of a park brake of a vehicle brake system that includes a brake cylinder having a service brake system and a park brake system; the service brake system includes a service brake chamber that is delimited by a service brake displaceable wall; a brake pushrod is fixed upon the service brake displaceable; the brake pushrod is connected to a vehicle braking means and is capable of moving under a pneumatic pressure from a first position whereby the braking means are released to an a second position whereby the braking means are actuated; the park brake system having actuating means capable of pushing said brake pushrod into its second position; the method includes the steps of:

measuring the actual volume V of the service brake chamber;

deriving from said actual volume V an actual park brake status. The park brake status monitoring method according to this invention is based on measuring the volume of the service brake chamber as the volume of the service brake chamber is a parameter which is representative of the actual position of the brake push rod and thus is representative of the actual park brake status. The method of the invention makes it possible to give the vehicle driver a true status of the park brake when said driver needs to apply or release the vehicle park brake. By monitoring the volume of the service brake chamber, the method of the invention can inform the driver of the actual position of the brake rod unlike the methods of the prior art which are generally based on a control of the air pressure of the service brake chamber.

The method according to the invention comprises the further step of the method comprises the further step of comparing said actual park brake status with a selected park brake status.

In practical terms, the step of deriving an actual park brake status can comprise the step of comparing the actual measured volume with at feast one predefined volume (Va, Vr) of the service brake chamber corresponding to a predefined park brake status.

The method can comprise further the step of verifying that the actual volume V of the service brake chamber is equal or greater to a predefined volume Va of the service brake chamber corresponding to the actuated park brake status.

To inform a vehicle driver of the actual park brake status, the method can comprise the further step of switching on a signal of park brake actuation if the actual actuated park brake status matches the selected actuated park brake status.

The method can comprise further the step of verifying that the actual volume V of the service brake chamber is lower or equal to a predefined volume Vr of the service brake chamber corresponding to the released park brake status. To inform the vehicle driver of a park brake malfunction, the method can comprise the further step of switching on a hazard signal of park brake failure, if the actual actuated park brake status does not match the selected actuated park brake status. This method is therefore able to detect a park brake malfunction whereby the park brake is applied by the vehicle driver but the park rod is still in its first position. This method is also able to detect a common malfunction of the park brake whereby the brake rod is jammed in a second position while the park brake rod is not actuated and while no pneumatic pressure is applied in the service brake chamber. Prior to initiating the step of measuring the volume of the service brake chamber, the method can comprise a step of checking that the vehicle is in a state whereby the vehicle service brake is not actuated or that the air supply is at a nominal level. This step is of importance as it is not advisable to monitor the park brake status when the vehicle service brake is actuated as it may interfere with the normal braking procedure nor it is necessary to initiate park brake status monitoring method when the vehicle air supply is defective or the vehicle air supply is in a built up pressure phase when the vehicle engine starts and the air compressor starts its air pressurizing action. In a possible embodiment of the method according to the invention, the park brake actuation means includes a park brake chamber delimited by a flexible park brake diaphragm upon which a park brake pushrod is fixed, the park brake pushrod being in tandem with the brake pushrod so that when the park brake is activated the park brake pushrod pushes the brake pushrod towards its second position. In a preferred embodiment of the invention, the measure of the actual volume of the service brake cylinder includes the steps of:

applying a pneumatic test signal Psb in the service brake chamber, measuring the response pressure of the service brake chamber, comparing the response pressure of the service brake chamber against at least at least one threshold pressure value.

In concrete words, the volume of the service brake chamber is estimated in a measuring cycle where a test air pressure is applied in the service brake chamber. The pneumatic response of the service brake chamber is then measured and compared against two preset pressure values representative of the two positions of the diaphragm each corresponding to an extreme position of the brake rod and therefore representative of the volume of the service brake chamber. The estimation of the volume relies on the fact that the pneumatic response of the service brake chamber depends on the position of the service brake diaphragm within the brake cylinder.

The response pressure of the service brake chamber can be compared against a threshold high pressure value Ph and against a threshold low pressure value Pl.

The pneumatic test signal can be applied to the service cylinder chamber at a pressure comprised between 0.1 bar and 0.5 bar. The pneumatic test signal has to remain low so as not to interfere with the normal brake operations. The pneumatic test signal can be applied for a period of time T1 comprised, for example, between 5 ms and 20 ms. The period of time T1 depends upon a vehicle specific pneumatic layout and brake chamber size.

The pneumatic test signal is maintained in the service brake chamber for a period of time T2 comprised, for example, between 5 ms and 10 ms. In any cases, the period of time T2 should allow enough time to obtain a significant pressure measurement.

The pneumatic test signal is purged from the service brake chamber over a period of time T3 of at least 50 ms to make sure that there is no test residual pressure in the service brake chamber.

Advantageously, the vehicle brake system includes an Electro pneumatic Brake System EBS having a CPU with I/O interface, a data memory such as a EEPROM or a Flash-PROM memory capable of storing T1, T2, T3 and a program memory such as a ROM memory, as the EBS incorporates the resources which are necessary to implement the method according to this invention. To determine the values of Ph, Pl, T1, the method can comprise a self learning sub routine having the steps of:

when the vehicle park brake is released, applying incremental test pressure signals during incremental periods of time T1$i$, until the test pressure reaches a brake threshold pressure stored into the EBS memory for a final value T1$f$ of T1$i$;

entering into the EBS memory, the test pressure value T1$f$ and a value of Ph as a fraction of brake threshold pressure;

when the vehicle park brake is applied, applying test pressure signals during the period of time T1$f$ and measure the pressure maximum value;

entering into the EBS memory, the value of Pl as a factor of the measured pressure.

The value of Ph can be, for example, equal to 0.9 of brake threshold pressure and the value of Pl can be for example equal to 1.1 of pressure maximum value;

T3 can similarly be set in a self learning procedure whereby:

the vehicle park brake is applied;

air pressure is applied for the period of time T1$f$;

air pressure is released for a measured period of time T3 which is equal to the period of time necessary to vent to atmosphere the service brake chamber multiplied by a safety factor.

These and other advantages will become apparent upon reading the following description in view of the drawing attached hereto representing, as a non-limiting example, an embodiment of a method according to the invention.

BRIEF DESCRIPTION OF THE DRAWINGS

The following detailed description of embodiments of the invention is better understood when read in conjunction with the appended drawing, being understood, however, that the invention is not limited to the specific embodiments disclosed. In the drawing.

DETAILED DESCRIPTION

Figure 1:
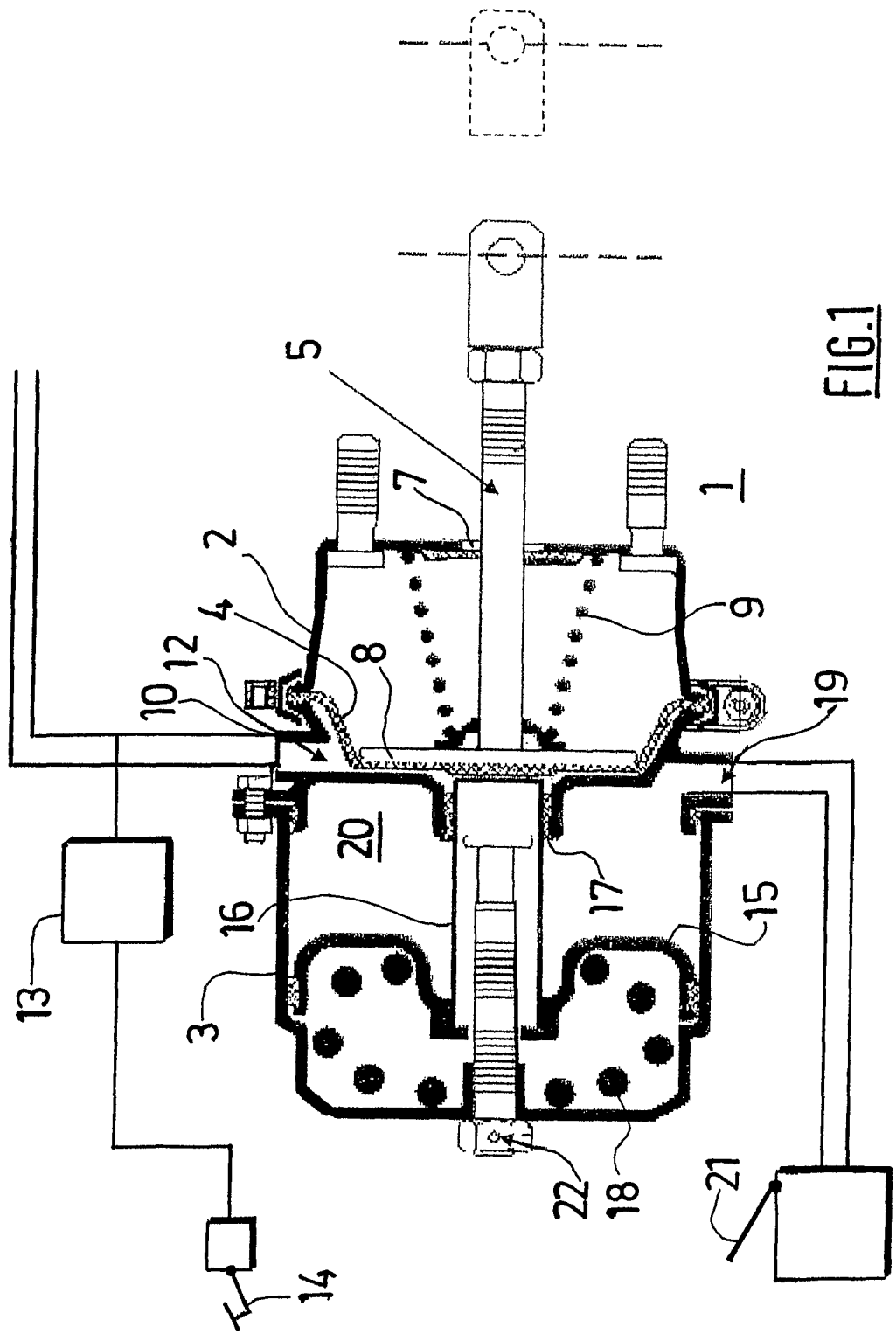
FIG. 1 is a sectional view of cylinder brake.

FIG. 1 illustrates a vehicular brake cylinder 1 that incorporates the method of the invention. As it will be apparent, the disclosed brake cylinder 1 is a diaphragm-type brake cylinder. However, the park brake monitoring method of this invention may be implemented with any type of commercially available brake cylinder such as for example a piston type brake cylinder. In both cases, the diaphragm or the piston act as a displaceable wall that defines a variable volume chamber. Each vehicle axle can be equipped with a brake cylinder similar to the brake cylinder 1 represented on FIG. 1. As this appears on FIG. 1, the disclosed brake cylinder 1 is comprised of two cylindrical housings, i.e. a service brake housing 2 and a park brake housing 3 secured to the latter.

The service brake housing 2 incorporates a flexible diaphragm 4 having a periphery retained by the service brake housing 2 and a brake pushrod 5. The service brake housing 2 is provided with a circular opening 7 through which the brake pushrod 5 can reciprocate and actuate a vehicle brake (not shown). The brake pushrod 5 includes a circular pushrod plate 8, for example, welded to the brake pushrod 5; the pushrod plate 8 is applied to the diaphragm 4 and is pushed to the latter by a return spring 9 which maintains the brake pushrod 5 in a first inward position whereby the brake is not actuated. The service brake housing 2 is further provided with a pneumatic input port 10 through which pressurized air can be introduced into a service brake chamber 12. The pneumatic pressure introduced into the service brake chamber 12 counteracts the action of the return spring 9 and thereby pushes the brake pushrod 5 into a second outward position (shown in dotted lines on FIG. 1) whereby the vehicle brake is actuated.

The pneumatic pressure input can be controlled by an Electro-pneumatic Brake System (EBS) illustrated by box 13 of FIG. 1. The EBS electronically controls the pneumatic signal which is fed to the service brake chamber 12. Depending on the magnitude of the action exerted by a vehicle driver onto a brake pedal 14, the EBS generates an electrical signal and redundantly a pneumatic signal. The electric signal is transmitted to a control unit. The control unit can be comprised of a microprocessor with I/O interface, an EEPROM or Flash-ROM and a ROM. According to the magnitude of the brake action onto the brake pedal 14 and possibly to further parameters such as for example the vehicle's load situation, the vehicle speed, the vehicle acceleration, the control unit calculates the appropriate pneumatic pressure for the vehicle brake cylinder 1 to cause the vehicle deceleration requested by the vehicle driver. The pneumatic signal is used as a redundancy circuit.

The brake cylinder 1 also incorporates a park brake housing 3 which is juxtaposed to the service brake housing 2. The park brake housing 3 incorporates a flexible diaphragm 15 having a periphery retained by the park brake housing 3 and a park pushrod 16. The park brake housing 3 is provided with an opening 17 which coincides with the service brake diaphragm 4; the park pushrod 16 can reciprocate through the opening 17; as the park pushrod 16 abuts onto the service brake diaphragm 4, an outward displacement of the park pushrod 16 causes an outward displacement of the brake pushrod 5. The brake cylinder is equipped a statutory screw 22. The screw 22 is used to manually deactivate the vehicle park brake. The screw 22 is used to compress the park spring 18 and thus to deactivate the vehicle park brake. The screw 22 is typically used to deactivate the vehicle park brake during vehicle servicing when the vehicle engine is at standstill and therefore no air pressure is available to counteract the park spring 18. The park pushrod 16 is secured onto the park diaphragm 15 which is pushed by a park spring 18. The park spring 18 exhibits a spring stiffness greater than the stiffness of the service spring 9. The park brake housing 3 is provided with a pneumatic input port 19 through which pressurized air can be introduced into a park brake chamber 20. The air cylinder 1 as represented on FIG. 1 is in a state whereby the park brake is in a released status. To maintain the brake cylinder 1 in this state, air pressure at a typical value comprised between 6 bars to 8 bars is applied in the park brake chamber 20 to counteract the park spring 18 and to push the park diaphragm 15; by doing so the park brake pushrod 16 which is secured to the park brake diaphragm 15 is maintained in an inward position. In other words, the park brake pushrod 16 does not interact with the brake pushrod 5. In this state of the cylinder brake wherein the park brake is in a released status, the brake pushrod 5 controls the vehicle brake according to the pneumatic signal delivered by the EBS. When the vehicle driver selects the actuated park brake state by usually pulling a handle 21, the pneumatic pressure is interrupted in the park brake chamber 20. Thereafter, the park brake spring 18 which is no longer maintained in a compressed state pushes the park brake pushrod 16 through the park brake housing opening 17; the park brake pushrod 16 which is in tandem with the brake pushrod 5 drives the latter in the outward position wherein the brake is actuated. The park brake is thereby actuated. The vehicle driver is usually notified the brake status of the vehicle by a visual signal which can be a red light on the vehicle dashboard. When the vehicle driver unselects the actuated park brake state by usually releasing the handle 21, pressurized air is introduced into the park brake chamber 20. A pneumatic pressure is applied to the park brake diaphragm 15 which moves the park brake pushrod 16 to an inward non actuated position; the brake pushrod 5 also moved to an inward non actuated position under the action of the service brake return spring 9.

The above described park brake is a pneumatically actuated park brake where the effort for maintaining the park brake push rod in its inward position is a pneumatic pressure suitably applied in a corresponding variable volume chamber.

Nevertheless the invention can be implemented in a braking system wherein the park brake would be for example hydraulically or electromagnetically actuated.

In any case, depending on the driver's decision, the park brake can be set in a selected actuated park brake status or a selected released park brake status.

It is important to notify the vehicle driver a park brake status that matches the actual park brake status. In other words, it is important to inform the driver of a mismatch between the selected park brake status and the actual park brake status which can occur, for example, when the park pushrod 16 and/or the brake pushrod 5 is/are jammed by frost.

The park brake status monitoring method according to this invention is based on measuring the volume of the service brake chamber 12 as the volume of the service brake chamber 12 is a parameter which is representative of the actual position of the brake pushrod 5 and thus is representative of the actual park brake status.

Figure 2:
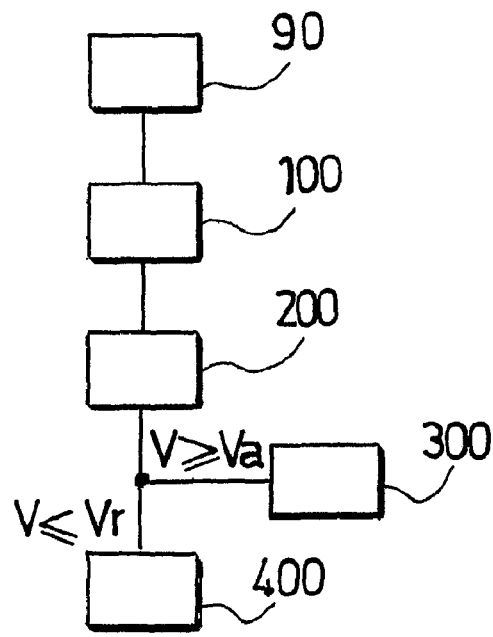
FIG. 2 is diagrammatic depiction of the monitoring method.

The general principle of the invention is schematically illustrated by the flow chart of FIG. 2.

Prior to initiating the step of measuring the volume of the service brake chamber, the method can comprise a step 90 of checking that the vehicle is in a state whereby the vehicle service brake is not actuated or that the air supply is at a nominal level, as it is neither advisable to monitor the park brake status when the vehicle service brake is actuated as it may interfere with the normal braking procedure; nor it is necessary to initiate park brake status monitoring method when the vehicle air supply is defective or during the pressure increase that occurs when the vehicle engine starts and drives the vehicle pneumatic compressor.

In a first step 100 the actual volume V of the service brake chamber 12 is measured. In a second step 200, the measured volume is compared with a volume Va of the service brake chamber 12 corresponding to the actuated status of the park brake and with a volume Vr of the service brake chamber 12 corresponding to the released status of the park brake.

In a step 300, if the measured volume V is equal to or greater than the volume Va, the driver is notified the actual actuated park brake status;

In a step 400, if the measured volume V is equal to or lower than the volume Vr, the driver is notified the actual released park brake status.

The method of invention is preferably implemented on a vehicle incorporating an EBS, as the latter already includes the technical means required to implement this invention.

Figure 3:
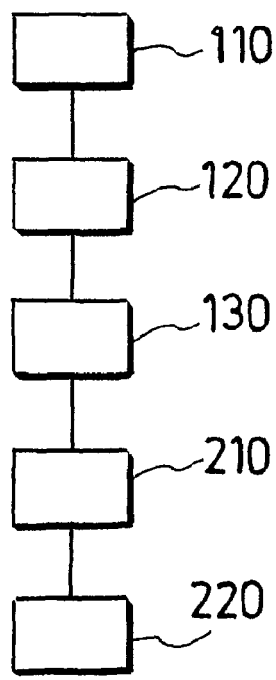
FIG. 3 is diagrammatic depiction of a service chamber measurement method.

In the described embodiment of this invention, the EBS can initiate a park brake status monitoring cycle, whereby the volume of the brake service chamber is measured as it is schematically illustrated on the flow chart of FIG. 3.

As illustrated on FIG. 3, the method according to this invention can comprise a first step 110 wherein a pneumatic test signal Pt is applied to the service brake chamber 12. Through data which can be stored in the EPROM or Flash-ROM memory, the EBS controls the value and the duration T1 of the pneumatic test signal Pt.

The pneumatic test signal Pt is limited to a relatively low pressure which can for example be comprised between 0.1 and 0.5 bar. Importantly the pneumatic test signal Pt remains less than the pneumatic pressure that can actuate the brake; in other words, the pneumatic test signal Pt remains insufficient to counteract the service brake return spring. The pneumatic test signal Pt does not interfere with the normal braking operation.

The pneumatic test signal Pt is applied for a period of time T1 that can be comprised between 5 ms to 20 ms. In a step 120, the pneumatic test signal Pt is maintained in the service brake chamber 12 for a period of time T2 which should be long enough to obtain a response pressure. For example, T2 can be comprised between 5 ms and 10 ms.

In a further step 130, the response pressure of the service brake chamber 12 is measured. This measure is carried out by pressure sensors that are incorporated in the EBS.

In a step 210, the response pressure is compared against a high threshold pressure value Ph indicating a low volume of the service brake chamber 12 and against a low threshold pressure value Pl indicating a high volume of the service brake chamber 12.

The service brake chamber 12 is then vented to atmosphere during a period of time T3 that can be for example of at least 50 ms.

Figure 4:
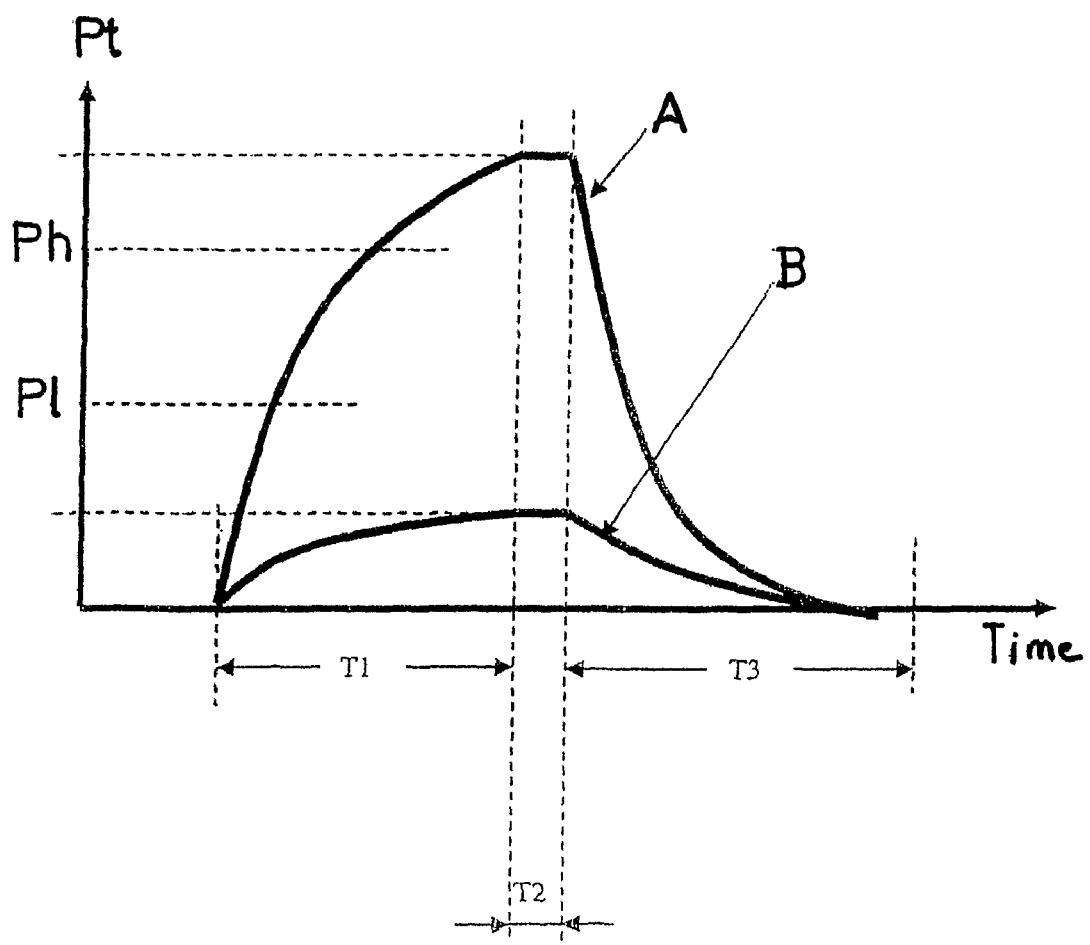
FIG. 4 is graphical representation as a function of time of a pressure response of a brake service chamber.

Curves A and B of FIG. 4 illustrate the response pressure of the service brake chamber 12. Curve A illustrates a case where the service brake chamber 12 is at a low volume which implies that the park brake is not actuated, whereas Curve B illustrates a case where the service brake chamber 12 is at a high volume which implies that the park brake is actuated.

The high threshold pressure value Ph and the low threshold pressure value Pl which can be adequately stored in the EEPROM or Flash-ROM of the EBS are set according to various vehicle features such as, for example, the type of brake or the actual brake layout.

In a routine performed by the CPU of the EBS, the measured response pressure is compared against said high and low threshold pressure values Ph and Pl.

If the measured response pressure is above the high threshold pressure value, the CPU identifies the park brake as being in a released state. The fact that the response pressure is above the high threshold pressure value indicates that the volume of the service brake chamber 12 is at a minimum and therefore the park brake is in a released state.

If the measured response pressure is below the low threshold pressure value, the CPU identifies the park brake as being in an actuated state. The fact that the response pressure is below the low threshold pressure value indicates that the volume of the service brake chamber 12 is at a maximum and therefore the park brake is in an actuated state.

The above defined cycle can be repeated two or three times to obtain a reliable status.

The value of each period of time T1 or T3 can be set according the specific parameters of a particular vehicle and entered into the EEPROM of the EBS accordingly. This requires numerous tests and can be a time consuming task.

To determine the values of Ph, Pl, T1, the method can comprise a self learning sub routine having the steps of:
when the vehicle park brake is released, applying incremental test pressure signals during incremental periods of time T1$i$, until the test pressure reaches a brake threshold pressure stored into the EBS memory for a final value T1$f$ of T1$i$;
entering into the EBS memory, the test pressure value T1$f$ and the value of Ph as a fraction of brake threshold pressure;
when the vehicle park brake is applied, applying test pressure signals during the period of time T1$f$ and measure the pressure maximum value;
entering into the EBS memory, the value of Pl as a factor of the measured pressure. T3 can similarly be set in a self learning procedure whereby:
the vehicle park brake is applied;
air pressure is applied for the period of time T1$f$;
air pressure is released for a measured period of time T3 which is equal to the period of time necessary to vent to atmosphere the service brake chamber multiplied by a safety factor.

The value of Ph can for example be equal to 0.9 of park brake threshold pressure and the value of Pl is equal to 1.1 of the vehicle park brake deactivated threshold pressure.

Unlike T1 and T3, the value of T2 can be set essentially according to the capability of the pressure sensing means of the EBS.

It should be noted that the park brake status monitoring method according to this invention is interrupted by the EBS when the service brake is actuated by the vehicle driver. In this case, actuation of the service brake takes priority over monitoring the park brake status, as it is important that the monitoring method of the invention does not interfere with the vehicle braking capabilities.

The actual park brake status that is monitored by the method according to the invention can then be compared with the selected park brake status that is to say the state imparted by the vehicle driver to the park brake control means, generally a hand lever or a push button in the case of an electrically controlled park brake.

The invention makes it possible to detect at least three possible failures of the park brake.

A possible park brake failure that is detected by the method according to this invention is the case wherein park brake actuation is selected by the vehicle driver for example by pulling a park brake hand lever but the park brake is not actually applied to the brakes. In this case the actuation park brake signal is not energized and/or a hazard signal is energised to notify the driver that the park brake is not under its actuated status. With this piece of information, the vehicle driver can take any appropriate emergency action such as, for example, engaging a gear to maintain the vehicle at a standstill.

A further possible brake failure can occur when the screw 22 is mistakenly left unscrewed after servicing. In such a case the park brake remains in a released state even if the driver intends to actuate the vehicle park brake. The actuation park brake signal is not energized and/or a hazard signal is energised to notify the driver that the park brake is not under its actuated status.

A further possible park brake failure that may be detected by the method according to this invention is the case wherein park brake actuation is de-selected by the driver by, for example, releasing the park brake lever whereas the park brake remains actually applied onto the brake. In this case the actuation park brake remains energized to notify the vehicle driver the actual park brake status. With this piece of information the vehicle driver can take any appropriate emergency action. The invention is not limited to the illustrative embodiments described above and shown in the drawings, but can be varied within the scope of the following patent claims. The method according to this invention can be implemented on a vehicle that does not incorporate an EBS. In this case, the service brake chamber 12 can be equipped with a pressure sensor to measure the pressure response of the service brake chamber 12.

The invention claimed is:

1. A method for monitoring a status of a park brake of a vehicle brake system that includes a service brake system and a park brake system wherein,
   (i) the service brake system includes a service brake chamber that is delimited by a service brake displaceable wall upon which a brake pushrod is fixed, the brake pushrod is connected to a vehicle braking means and is capable of moving under a pneumatic pressure from a first position whereby the braking means are released to a second position whereby the braking means are actuated,
   (ii) the park brake system having actuating means capable of pushing the brake pushrod into its second position,
   wherein the method comprises:
     measuring an actual volume V of the service brake chamber;
     deriving from the actual volume V an actual park brake release status or a park brake actuated status,
   wherein measuring the actual volume of the service brake cylinder includes the steps of:
     applying a pneumatic test signal in the service brake chamber with a pneumatic test signal pressure remaining less than the pneumatic pressure that can actuate the brake,
     measuring a response pressure of the service brake chamber,
     comparing the response pressure of the service brake chamber against at least one threshold pressure value.

2. The method according to claim 1, wherein the method comprises the further step of comparing the actual park brake status with a selected park brake status.

3. The method according to claim 1, wherein the step of deriving an actual park brake status comprises comparing the actual measured volume with at least one predefined volume of the service brake chamber corresponding to a predefined park brake status.

4. The method according to claim 3, wherein the method comprises verifying that the actual volume of the service brake chamber is equal or greater to a predefined volume of the service brake chamber corresponding to the actuated park brake status.

5. The method according to claim 4, comprising switching on a signal of park brake actuation if the actual actuated park brake status matches the selected actuated park brake status.

6. The method according to claim 5, wherein the method comprises verifying that the actual volume of the service brake chamber is lower or equal to a second predefined volume of the service brake chamber corresponding to the released park brake status.

7. The method according to claim 6, wherein the method comprises switching on a hazard signal of park brake failure, if the actual actuated park brake status does not match the selected actuated park brake status.

8. The method according to claim 6, wherein, before implementing the measuring step, the step of comparing the actual measured volume with at least one predefined volume of the service brake chamber corresponding to the predefined park brake status, the step of verifying that the actual volume of the service brake chamber is equal or greater to a third predefined volume of the service brake chamber corresponding to the actuated park brake status, and the step of verifying that the actual volume of the service brake chamber is lower or equal to a predefined volume of the service brake chamber corresponding to the released park brake status, checking that the vehicle is in a state where the vehicle service brake is not actuated or that the air supply is at a nominal level.

9. The method according to claim 1, wherein the park brake actuation means includes a park brake chamber delimited by a flexible park brake diaphragm upon which a park brake pushrod is fixed, the park brake pushrod being in tandem with the brake pushrod so that when the park brake is activated the park brake pushrod pushes the brake pushrod towards its second position.

10. The method according to claim 1, wherein the response pressure of the service brake chamber is compared against a threshold high pressure value and against a threshold low pressure value.

11. The method according to claim 10, wherein the pneumatic test signal is applied for a period of time T1 between 5 ms and 20 ms.

12. The method according to claim 11, wherein the pneumatic test signal is maintained in the service brake chamber for a period of time T2 between 5 ms and 10 ms.

13. The method according to claim 12, comprising purging the pneumatic test signal from the service brake chamber over a period of time T3 of least 50 ms.

14. The method according to claim 13, wherein the vehicle brake system includes an Electro pneumatic Brake System EBS having a CPU with I/O interface, a data memory such as a EEPROM or Flash-ROM memory capable of storing T1, T2, T3 and a program memory such as a ROM memory.

15. The method according to claim 13 wherein T3 can be set in a self learning sub routine whereby:
    the vehicle park brake is applied;
    air pressure is applied for the period of time T1$f$;
    air pressure is released for a measured period of time T3 which is equal to the period of time necessary to vent to atmosphere the service brake chamber multiplied by a safety factor.

16. The method according to claim 14, wherein the method comprises a self learning sub routine having the steps of:
    when the vehicle park brake is released, applying incremental test pressure signals during incremental periods of time T1$i$, until the test pressure reaches a brake threshold pressure stored into the EBS memory for a final value T1$f$ of T1$i$;
    entering into the EBS memory, the test pressure value T1$f$ and a value of Ph as a fraction of brake threshold pressure;
    when the vehicle park brake is applied, applying test pressure signals during the period of time T1$f$ and measure the pressure maximum value;
    entering into the EBS memory, the value of Pl as a factor of the measured pressure.

17. The method according to claim 16, wherein the value of Pl is equal to 1.1 of the vehicle park brake deactivated threshold pressure.

18. The method according to claim 16, wherein the value of Ph is equal to 0.9 of park brake threshold pressure.

19. The method according to claim 1, wherein the pneumatic test signal is applied to the service cylinder chamber at a pressure comprised between 0.1 bar and 0.5 bar.

* * * * *